United States Patent
Anghel et al.

(10) Patent No.: US 11,663,067 B2
(45) Date of Patent: May 30, 2023

(54) COMPUTERIZED HIGH-SPEED ANOMALY DETECTION

(71) Applicant: International Business Machines Corporation, Armonk, NY (US)

(72) Inventors: Andreea Anghel, Adliswil (CH); Mitch Gusat, Langnau a.A. (CH); Georgios Kathareios, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 15/843,949

(22) Filed: Dec. 15, 2017

(65) Prior Publication Data
US 2019/0188065 A1 Jun. 20, 2019

(51) Int. Cl.
*G06F 11/07* (2006.01)
*G06N 5/04* (2023.01)
*G06N 20/00* (2019.01)

(52) U.S. Cl.
CPC ........ *G06F 11/079* (2013.01); *G06F 11/0709* (2013.01); *G06F 11/0751* (2013.01);
(Continued)

(58) Field of Classification Search
CPC .......... G06N 5/04; G06N 20/00; G06N 20/10; G06N 20/20; G06F 11/079;
(Continued)

(56) References Cited

U.S. PATENT DOCUMENTS 9,319,421 B2   4/2016   Ferragut et al.
9,361,463 B2   6/2016   Ferragut et al.
(Continued)

FOREIGN PATENT DOCUMENTS

WO   WO-2018037411 A1 * 3/2018 ........... G06F 21/552

OTHER PUBLICATIONS

An et al., Variational Autoencoder based Anomaly Detection using Reconstruction Probability, Dec. 27, 2015, 18 pages (Year: 2015) (Year: 2015).*
(Continued)

*Primary Examiner* — Li B. Zhen
*Assistant Examiner* — William Wai Yin Kwan
(74) *Attorney, Agent, or Firm* — Cantor Colburn LLP; Daniel Morris

(57) ABSTRACT

Embodiments of the invention include a computer-implemented method for detecting anomalies in non-stationary data in a network of computing entities. The method collects non-stationary data in the network and classifies the non-stationary data according to a non-Markovian, stateful classification, based on an inference model. Anomalies can then be detected, based on the classified data. The non-Markovian, stateful process allows anomaly detection even when no a priori knowledge of anomaly signatures or malicious entities exists. Anomalies can be detected in real time (e.g., at speeds of 10-100 Gbps) and the network data variability can be addressed by implementing a detection pipeline to adapt to changes in traffic behavior through online learning and retain memory of past behaviors. A two-stage scheme can be relied upon, which involves a supervised model coupled with an unsupervised model.

16 Claims, 6 Drawing Sheets

(52) U.S. Cl.
CPC ........... *G06F 11/0778* (2013.01); *G06N 5/04* (2013.01); *G06N 20/00* (2019.01)

(58) Field of Classification Search
CPC ............. G06F 11/0709; G06F 11/0751; G06F 11/778; G06F 11/0778
See application file for complete search history.

(56) References Cited

U.S. PATENT DOCUMENTS

| | | | |
|---|---|---|---|
| 9,378,079 | B2 | 6/2016 | Ivanova et al. |
| 9,699,205 | B2 | 7/2017 | Muddu et al. |
| 2007/0220034 | A1* | 9/2007 | Iyer ................... G06F 16/2465 707/999.102 |
| 2015/0254555 | A1* | 9/2015 | Williams, Jr. ....... G06N 3/0454 706/14 |
| 2017/0063905 | A1 | 3/2017 | Muddu et al. |

OTHER PUBLICATIONS

Zhou et al, Distributed Anomaly Detection by Model Sharing, 2009 International Conference on Apperceiving Computing and Intelligence Analysis, IEEE 2009, pp. 297-300 (Year: 2009) (Year: 2009).*

Tuor et al., Deep Learning for Unsupervised Insider Threat Detection in Structure Cybersecurity Data Streams, arXiv:1710.00811v1, Oct. 2, 2017, 9 pages (Year: 2017) (Year: 2017).*

Casas et al., UNADA: Unsupervised Network Anomaly Detection Using Sub-space Outliers Ranking, In Networking 2011, Part I, LNCS 6640, 2011 IFIP International Federation for Information Processing, pp. 40-51 (Year: 2011) (Year: 2011).*

Casas et al., "Machine-Learning Based Approaches for Anomaly Detection and Classification in Cellular Networks," Proceedings of the 8th International Workshop on Traffic Monitoring and Analysis, 2016, pp. 1-8.

Casas et al., "UNADA: Unsupervised Network Anomaly Detection Using Sub-space Outliers Ranking," Networking 2011, Part 1, LNCS 6640, 2011, pp. 40-51.

Dromard et al., "Online and Scalable Unsupervised Network Anomaly Detection Method," IEEE Transactions on Network and Service Management, IEEE, 2017, 14 (1), 2017, pp. 34-47.

Gander et al., "Anomaly Detection in the Cloud: Detecting Security Incidents via Machine Learning," EternalS@ ECAI, 2012, pp. 1-7.

Veeramachaneni et al., "AI/\ 2:Ttraining a big data machine to defend," Big Data Security on Cloud (BigDataSecurity), IEEE International Conference on High Performance and Smart Computing (HPSC), and IEEE International Conference on Intelligent Data and Security (IDS), 2016 IEEE 2nd International Conference on. IEEE, 2016, 13 pages.

* cited by examiner

COMPUTERIZED HIGH-SPEED ANOMALY DETECTION

BACKGROUND

The invention relates in general to the fields of computer-implemented methods and systems for detecting anomalies in a network of computing entities, such as a cloud. In particular, it is directed to methods for detecting anomalies from non-stationary data, according to a non-Markovian, stateful classification of such data.

Two prevalent approaches in designing anomaly detection systems are known, which are based on signatures or behaviors of the data traffic. Signature-based detection relies on the existence of a collection of known attack signatures that gets updated every time a new attack is found. The detection is performed by checking whether the signature of suspicious traffic matches a signature in the available collection. While such systems excel in detecting known attacks, they generally fail to detect new malicious traffic.

Behavioral detection may be useful in defending against novel malicious behaviors, for which signatures are not available yet. This detection typically relies on machine learning to create profiles for behaviors of the normal network traffic. The profiles are used to detect anomalies, i.e., traffic having a behavior that diverges significantly from a norm. A merit of this approach is that it can operate without prior knowledge or traffic assumptions, often being unsupervised in nature.

Behavioral-based network anomaly detection mechanisms are prevalently based on Markovian methods and, as such, have several drawbacks. In particular, a downside of such methods arises due to that attacks may be highly volatile and long-lasting. For instance, window-based Markovian methods, despite being highly adaptive, encounter a paradox during long-lasting events that also dominate the traffic, e.g., Denial-of-Service (DoS) attacks: Within some time windows the detector perceives the dominant attack traffic as normal, and the rest (i.e., benign traffic) as anomalous.

SUMMARY

According to a first aspect, the present invention is embodied as a computer-implemented method for detecting anomalies in non-stationary data in a network of computing entities, such as a cloud. The method relies on collecting non-stationary data in the network. In addition, and while collecting this non-stationary data, the non-stationary data collected is classified according to a non-Markovian, stateful classification, based on an inference model. Anomalies can then be detected, based on the classified data.

The above method processes non-stationary data; it performs anomaly detection based on a non-Markovian, stateful process, which allows anomaly detection even when no a priori knowledge of anomaly signatures or malicious entities exists. As discussed below and in the next section, the present approach allows anomalies to be detected in real time (e.g., at speeds of 10-100 Gbps). In addition, this approach makes it possible to address the network data variability by implementing an anomaly detection pipeline such as to adapt to changes in traffic behavior through online learning and retain memory of past behaviors, in contrast to prevailing Markovian approaches. To that aim, the present methods can be embodied as a two-stage scheme, involving a supervised model coupled with an unsupervised model.

The above method may notably be embodied so as to comprise one or more of the following, optional features:

The non-Markovian, stateful classification involves an inference model that is a trained, unsupervised machine learning model, which allows an autonomous pre-selection of anomalies. This model can be implemented as an auto-encoder by a neural network, in which case the classification may advantageously be performed according to a reconstruction error of the auto-encoder, as discussed below. Still, the unsupervised model may be a multi-layer perceptron model, yet implemented in a form of an auto-encoder by the neural network;

Classifying the non-stationary data collected comprises: selecting outputs from the classification performed thanks to the inference model; and feeding the selected outputs into a supervised, machine learning model, for it to further classify the selected outputs whereby said anomalies are detected based on outputs from the supervised model. This way, a two-stage process is achieved, which is easily scalable. The autonomous pre-selection of anomalies performed at the first stage allows a tractable processing at the second stage;

The unsupervised model is implemented as an under-complete auto-encoder by the neural network. This way, the classification performed by the inference model may rely on a (dimensional) reduction of each data point taken as input by the auto-encoder;

Classifying the collected data comprises: forming data points from the collected, non-stationary data; and, for each data point of the formed data points: feeding the auto-encoder with said each data point for the auto-encoder to reconstruct said each data point according to one or more parameters learned by a cognitive algorithm of the auto-encoder; and scoring a degree of anomaly of said each data point, according to a reconstruction error in reconstructing said each data point, to obtain anomaly scores. This makes it possible to achieve very fast inferences;

The classification performed by the inference model may further comprise sorting the data points according to their corresponding anomaly scores;

The anomaly scores may be normalized, just like the corresponding data points;

The classification performed by the inference model further comprises thresholding the normalized anomaly scores to obtain a selection of anomaly scores and a corresponding selection of data points;

This classification further comprises feeding the selection of data points into a supervised, machine learning model, for it to further classify the selection of data points, whereby said anomalies are detected based on outputs from the supervised model;

The supervised model is configured as a nearest-neighbor classifier;

Further classifying the selection of data points (thanks to the nearest-neighbor classifier) comprises: querying, for each data point of said selection fed into the supervised model, nearest-neighbors of said each data point;

Querying nearest-neighbors of said each data point comprises, for said each data point: computing distances between said each data point and already labelled data points; and identifying nearest-neighbors of said each data point based on the computed distances, and the selection of data points is further classified by rating said each data point based on labels associated with the identified nearest-neighbors;

Detecting anomalies comprises triggering an anomaly alert based on a rating associated with said each data point;

The method further comprises, if no sufficiently close neighbors can be identified based on the computed distances, recirculating said each data point through the supervised model until sufficiently close nearest-neighbors can be identified;

The supervised model is coupled to a validation expert system, and the method further comprises feeding the validation expert system with a sample of outputs from the supervised model, said outputs comprising data points as further classified by the supervised model, for the validation expert system to validate anomaly ratings associated to data points corresponding to said sample;

The supervised model is additionally fed with at least part of the data points whose anomaly ratings have been validated by the validation expert system;

The validation expert system further takes as input a fraction of said selection of data points as a feedforward injection;

The fraction of the data points taken as input by the validation expert system as a feedforward injection is constrained to correspond to less than 10% of said selection of data points;

The sample of outputs from the supervised model taken as input by the validation expert system is constrained to contain data points corresponding to less than 10% of the further classified data points;

Collecting the non-stationary data comprises: parsing data packets of non-stationary data flowing in the network from distinct sources; aggregating, for each of the distinct sources and for given time intervals, data flows based on the data parsed; and defining a data point for each of the aggregated data flows, based on said each of the aggregated data flows;

Parsing data packets comprises parsing header-related data of the data packets in one or more network layers; collecting the non-stationary data further comprises monitoring one or more metrics of non-stationary data flowing in the network; and said data point is further defined according to the monitored metrics; and In order to address the network data variability, the method may further comprise training a cognitive algorithm (while collecting and classifying the collected data), which algorithm corresponds to said inference model, to obtain a trained model. The training is based on collected data and typically requires to maintain a history of non-stationary data in the network. Then, the inference model as currently used to classify the non-stationary data may be substituted by the trained model, e.g., upon detecting a substantial change in the parameter(s) learned by the algorithm. Next, non-stationary data can be further classified (and still according to a non-Markovian, stateful classification), based on the substituted model, so as to be able to detect new anomalies in further classified data.

According to another aspect, the invention is embodied as a computerized system adapted to interact with a network of computing entities, e.g., a cloud, for detecting anomalies in non-stationary data in the network. Consistently with the above methods, the system is configured for collecting non-stationary data in the network and, while collecting said non-stationary data, classifying the collected non-stationary data according to a non-Markovian, stateful classification, based on an inference model, so as to detect anomalies in the non-stationary data collected, according to the classified data, in operation.

In embodiments of the invention, the system comprises a memory storing both an inference model, which is a trained, unsupervised machine learning model, and a nearest-neighbor classifier model, which is a supervised machine learning model. The system is further configured to select outputs from data classified with said inference model and feed the selected outputs into the supervised, machine learning model, so as to detect said anomalies based on outputs from the supervised model.

In embodiments of the invention, the system further comprises a validation expert system configured to couple to the supervised model, so as for the validation expert system to take as input a sample of outputs from the supervised model and for the supervised model to take as input a fraction of outputs obtained from the validation expert system.

According to a final aspect, the invention is embodied as a computer program product for detecting anomalies in non-stationary data in a network of computing entities. The computer program product comprises a computer readable storage medium having program instructions embodied therewith, the program instructions executable by one or more processors, to cause to implement all the steps of the above method, in any embodiment thereof.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION

The following description is structured as follows. First, general embodiments and high-level variants are described (sect. 1). The next section addresses more specific embodiments and technical implementation details (sect. 2).

1. General Embodiments and High-Level Variants

In reference to FIGS. 1-6, an aspect of the invention is first described, which concerns a computer-implemented method for detecting anomalies in non-stationary data flowing in a network of computing entities, hereafter assumed to be a cloud 20, for the sake of illustration.

This method relies on collecting non-stationary data flowing in the cloud 20. The non-stationary data collection is generally denoted by step S10. The data collected are moving data (i.e., data sent by nodes of the cloud to other nodes), as opposed to static data (e.g., data that is statically stored on resources of the cloud). Non-stationary data relates to data traffic, data communication and/or patterns of moving data. More generally, such data relates to dynamic events occurring in the cloud, this including network intrusions. The non-stationary data may for instance consists of encrypted data, e.g., end-to-end encoded or encapsulated data flows, streams, or time-series.

Figure 4:
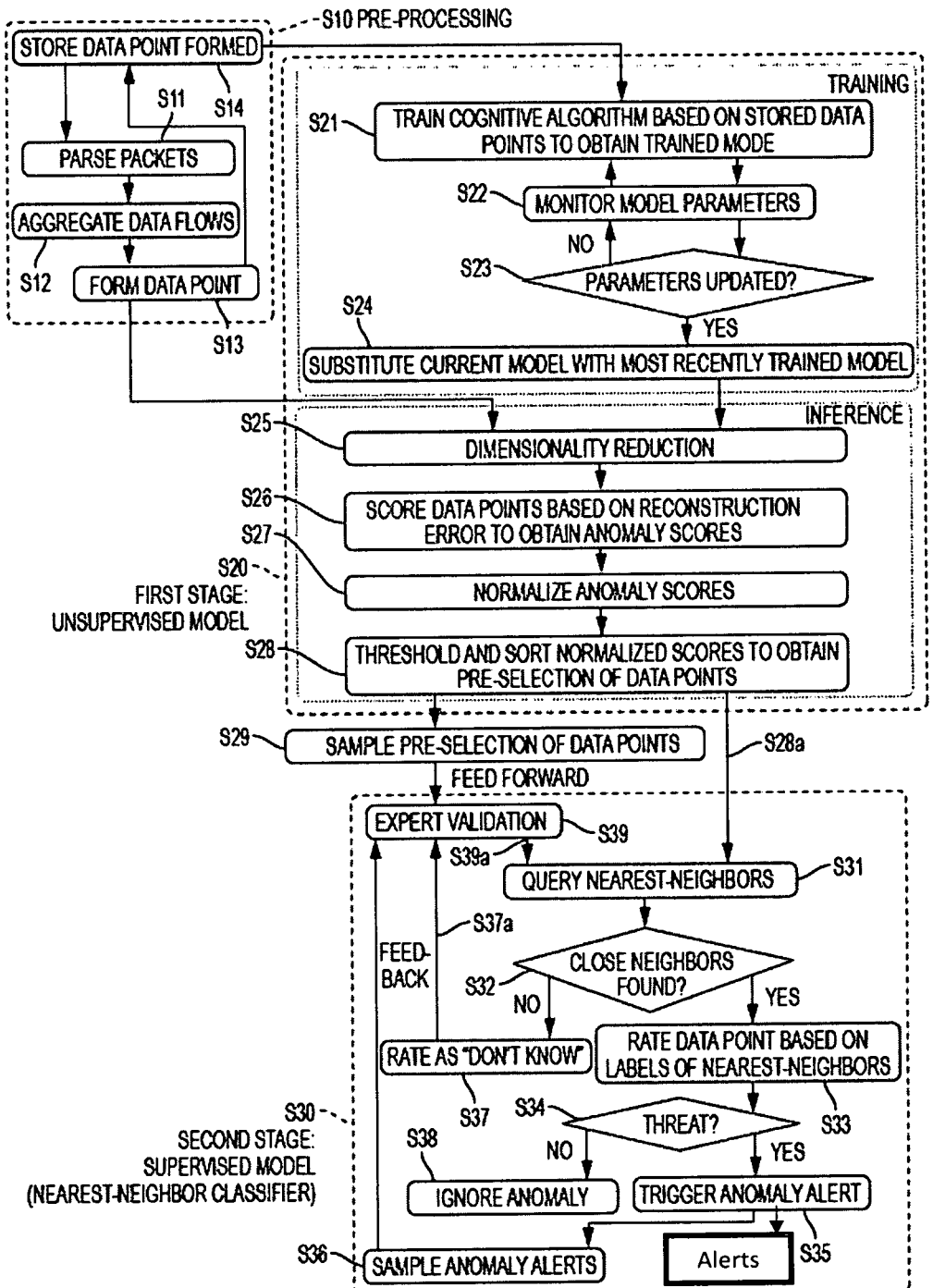
FIG. 4 is a flowchart illustrating steps of a method for detecting anomalies in non-stationary data in a cloud, according to embodiments.

The data collection S10 typically involves a number of pre-processing steps S11-S14, as seen in FIG. 4, and allows a history of non-stationary data to be maintained. Maintaining non-stationary data may for instance involve storing corresponding data in one or more data storage components 11, 14 of the system 1 (from FIG. 6), e.g., to train (or retrain) a cognitive algorithm, as well as sampling such data, as necessary to perform the desired classification, as discussed later.

According to the present methods, the non-stationary data collected S10 are classified S20 according to a non-Markovian, stateful classification, which classification is based on an inference model. As a non-Markovian process, the present classification relies on prior states of the non-stationary data collected. I.e., this process does not have the Markov property. The Markov property of a given system is a memoryless property, e.g., resulting in that the conditional probability of a future state of this system only depends on its present state, while being independent from any prior state. On the contrary, the non-Markovian processes involved herein keep track of prior states of the non-stationary data collected.

Moreover, the stateful (also called memoryful) processes involved herein track information about the sender and/or the receiver of the non-stationary data collected S10. This can be achieved by forming data points (e.g., in the form of vectors of n features each), where data points are formed by aggregating data related to data flows from respective sources and for given time periods. More generally, a data point can be regarded as any dataset suitable for use by machine learning model(s) as proposed in embodiments discussed herein.

Of particular interest is that the classification S20 is performed online, i.e., while collecting data S10. E.g., each data point formed upon collecting new data can be directly analyzed online (i.e., on-the-fly), by the inference model, which allows processing speed. A particularly advantageous way of analyzing online data points is to score anomalies based on a reconstruction error of the inference model, as the latter reconstructs data points it ingests on-the-fly.

Eventually, anomalies are detected S35-S39 from the non-stationary data collected S10 and then classified S20, S30, according to a non-Markovian, stateful process. Anomalies in the non-stationary data may generally relate to traffic anomaly, such as network attacks on the business environment, unauthorized accesses, network intrusions, improper data disclosures or data leakages, system malfunctions or data and/or resources deletion, etc.

Two other important features of the present method is that: (i) it processes non-stationary data; and (ii) the non-Markovian classification involved does not depend on Bayesian priors. I.e., this method works without any prior assumptions as to the input data streams, which allows anomalies to be detected even when no a priori knowledge of anomaly signatures or malicious entities exists.

The present approach can further be made versatile, so as to near-exhaustively detect anomalies in near real time (e.g., at speeds of 10-100 Gbps). In particular, the network data variability can be addressed by implementing an efficient anomaly detection pipeline, designed to adapt to sudden changes in traffic behavior (through online learning) and retain memory of past behaviors, in contrast to prevailing Markovian approaches. To that aim, the above method can be embodied as a two-stage scheme, involving both a supervised model S10 coupled to an unsupervised model S20.

All this is now explained in detail, in reference to particular embodiments of the invention.

Figure 2:
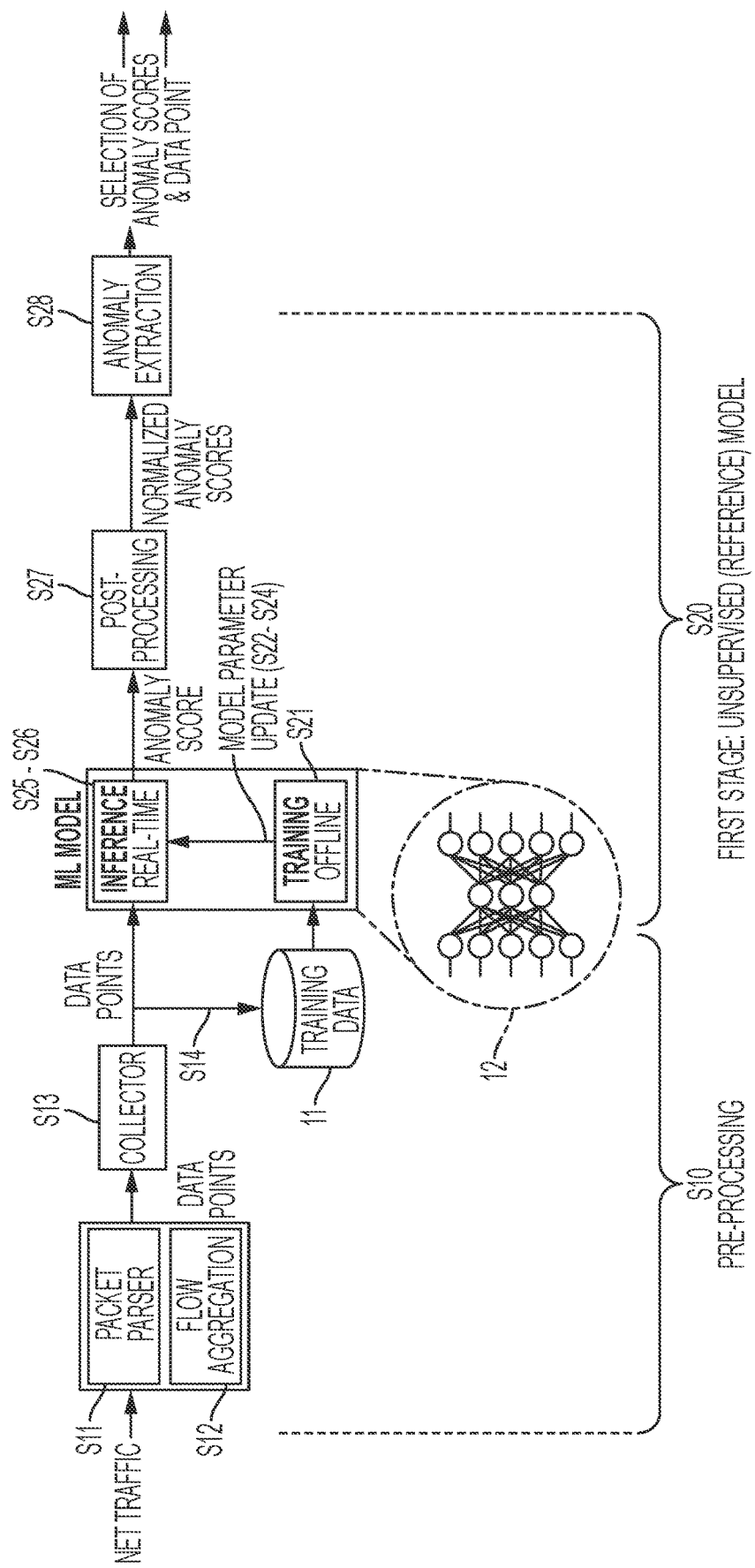
FIG. 2 is a block diagram that schematically illustrates selected components and operations involved during the pre-processing stage and the unsupervised processing stage of FIG. 1, as in embodiments.
Figure 5:
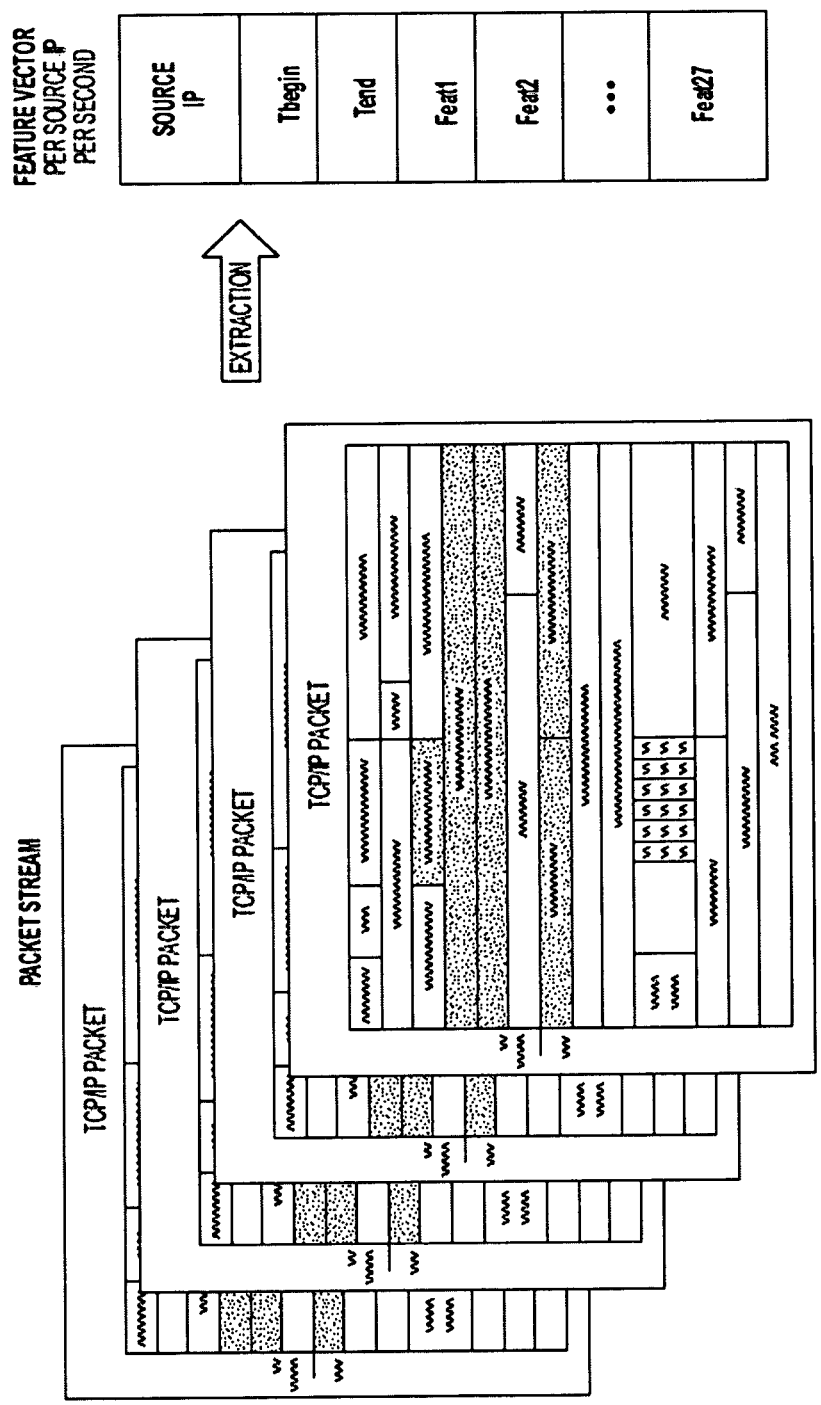
FIG. 5 illustrates the parsing of header data in streamed data packets, for aggregating corresponding data flows and defining data points in the form of feature vectors, as in embodiments of the invention.

To start with, referring to FIGS. 2 and 5, the data collection S10 can involve parsing S11 data packets from distinct data sources (i.e., source nodes of the cloud 20 (from FIG. 6)). Then, data flows may be aggregated S12 for each of the distinct sources and for given time intervals (e.g., successive and contiguous time intervals), based on the data parsed S11. Eventually, a data point can be defined S13 for each of the aggregated data flows.

This way, per-source data flow aggregations are obtained, and for given time intervals, which make it possible to keep track of successive states of the non-stationary data captured and, eventually, to localize the sources of anomalies detected. In variants, one may track the destinations (or both the sources and destination), e.g., so as to isolate the destination in case an anomaly is detected. To that aim, the aggregation can possibly be performed based on destinations, rather than or in addition to the sole sources. Most efficient, however, is to keep track of the sole data sources.

For example, for each traffic source s, per-source flow aggregations can be created as sets of data packets (e.g., all packets) that originate from s and have timestamps within consecutive, non-overlapping time intervals of length $\Delta t$, where $\Delta t$ is, for example, a modifiable (e.g., user-defined) aggregation time interval. In variants, this interval can be adaptively set. By default, $\Delta t$ may for instance correspond to 1 second. For each flow aggregation, a data point can be defined, e.g., as a vector of n features computed over the aggregation. Such features may include any data contents (e.g., source IP, timestamps, type of service, etc.) and, more generally, any metrics that can be extracted from the flow aggregation, as exemplified in sect. 2.1.

In embodiments of the invention, the parsing S11 of data packets comprises (and can restrict to) the parsing of header-related data of the data packets. Header-related data is data in one or more network layers that correspond to the header section, or to corresponding frames or datagrams. In addition, one or more network metrics (pertaining to the non-stationary data flowing in the cloud) may be concurrently monitored. Thus, data points may be formed S13 according to both the monitored metrics and features extracted from header-related data. For example, detection may solely be based on: (i) header information included in some of the network layers (e.g., Layer 2 to 4); and (ii) metrics of the network flows themselves, such as the rate of packets per second.

Such embodiments rely on behavioral statistics (packet sizes, average number of packets per flow, number of packets having given TCP flag, etc.), which involve a stateful tracking scheme, i.e., the mechanism keeps track of the source and/or destination of the non-stationary data, so as to make it possible to quickly act on the source and/or destination upon anomaly detection.

Because communications may likely be end-to-end encrypted, embodiments discussed herein can be configured to not rely on Deep Packet Inspection (DPI) and instead rely on packet headers and monitored metrics of the network flows. Consistently, the present methods can be protocol-agnostic.

The data collection S10 may involve several mechanisms, e.g., relying on interactions with network nodes, network monitoring entities or external sources, involving any network measurement architecture (such as the so-called Planck architecture), which may possibly be based on any data streams, mirror traffic, packet analyzers (Pcap files), threat intelligence feeds, etc. Several network traffic analysis tools are known, which may possibly be used in embodiments of this invention.

Referring now to FIGS. 2 and 4, the non-Markovian classification can rely on an unsupervised, machine learning model, suitably trained to operate autonomously. The task of the underlying, cognitive algorithm is to infer a function describing the hidden structure of unlabeled data points it takes as input. Once trained, the model operates autonomously, so as to allow a quick preselection of potential anomalies.

As one may expect attacks to occur in a sudden manner, one may want anomaly scores to be computed for each incoming data point in near real-time. To do so, one can separate the slower training from the faster score inference, thanks to different instances of the model that run in parallel. More precisely, and as illustrated in FIGS. 2 and 4, the cognitive algorithm underlying the inference model may be retrained, while a previously trained model is used to classify S20 non-stationary data. Then, the resulting (trained) model may be substituted S23-S24 to the current inference model, so as to keep on classifying S20 newly collected data based on the substituted model. This makes it possible to fairly quickly adapt to sudden changes in the network traffic and thus to more efficiently detect new anomalies.

The substitution can be decided S22, S23 based on the evolution of the parameters of the learning algorithm. In variants, however, one may periodically replace a current inference model with the most recently retrained model. In other variants, the frequency of substitution may depend on the data traffic.

Not that, in the literature, the terms "cognitive algorithm", "cognitive model", "machine learning model" or the like are interchangeably used. This description makes no exception. However, in an effort to clarify terminologies, one may tentatively adopt the following definition: a machine learning model is generated by a cognitive algorithm, which learns its parameter(s) from input data points, so as to arrive at this model. Thus, a distinction can be made between the cognitive algorithm being trained and the model that eventually results (called trained model or retrained model) upon completion of the training of the underlying algorithm.

Figure 3:
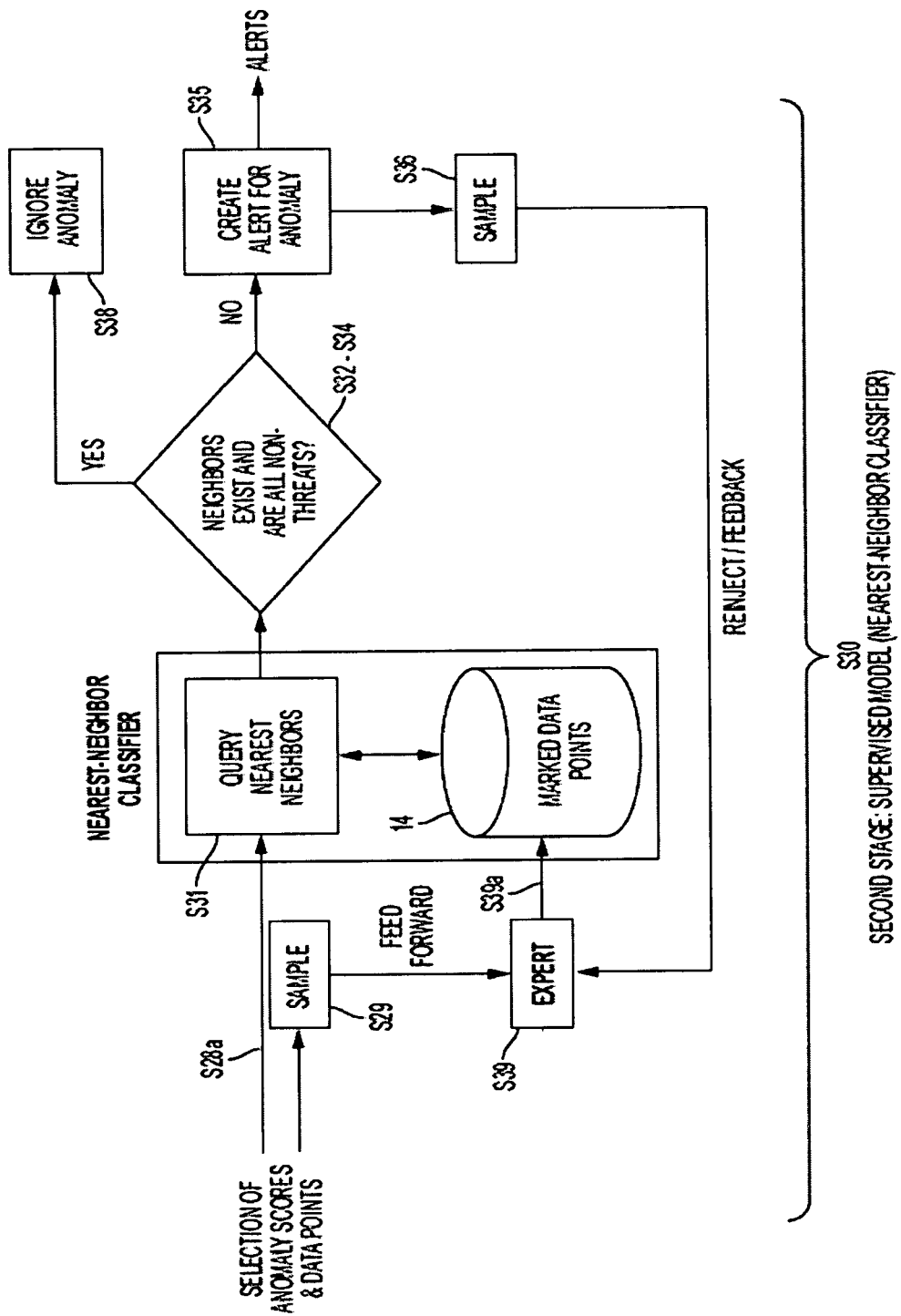
FIG. 3 is a block diagram schematically illustrating selected components and operations involved during the supervised stage of FIG. 1, according to embodiments.

Now, because not all anomalies detected (or, rather, scored or pre-selected) by the unsupervised model S20 may constitute malicious behaviors, a second stage of analysis can be implemented, as discussed now in reference to FIGS. 3 and 4.

Namely, the classification performed at S20 is advantageously augmented with a second stage S30 of analysis. In simple implementations, the second stage S30 involves a mere computerized validation procedure, which may possibly involve a human operator. In embodiments of the invention, the second stage involves a machine learning model S30 too. The latter, however, is essentially independent from the first model S20, thus yielding a serial coupling of two independent machine learning models S20, S30. In embodiments of the invention, the second stage relies on a supervised model, whose machine learning task is to infer a function from already labeled data, as obtained from the first stage and possibly validated (in part) by an expert system.

Practically, this can be achieved by selecting S26-S28 outputs as obtained from the first stage S20 and feeding S28a the selected outputs into the second stage S30. Eventually, anomalies are detected S35-S39 based on outputs from the supervised model. Because selected outputs (only) are fed into the second stage S30, the overall anomaly detection scheme can easily be made scalable. In addition, the fraction of outputs selected can easily be tuned, e.g., to adapt to real-time traffic density, for instance.

Example implementations of the first and second stages S20, S30 are now described in detail. To start with, referring to FIGS. 2, 4, the first-stage (unsupervised) model can be implemented S20 as an auto-encoder by a neural network 12. The latter takes part or all of the collected S10, non-stationary data as input, e.g., in the form of data points (feature vectors) as discussed earlier. Input data points are then classified S20 by the neural network 12, in an unsupervised manner. The classification can advantageously be performed according to a reconstruction error of the auto-encoder. E.g., the reconstruction error of the trained auto-encoder can be directly (or indirectly) used as an approximation of anomaly scores assigned to the collected data.

Note that a neural network is here considered to be a computer system (a combination of both hardware and software). An auto-encoder (also referred to as auto-associator) refers to a specific configuration of a neural network, specifically directed to unsupervised learning of efficient coding. The auto-encoding tasks may for instance be performed by a deep neural network (DNN), such as a convolutional neural network (CNN). Stacked auto-encoders may possibly be used too.

The auto-encoder can be implemented as a feed-forward neural network, for simplicity. The auto-encoder, having parameter(s) $\theta$, implements an encoding function $f_\theta$ and a decoding function $g_\theta$. In more detail, the auto-encoder maps input $x_i$ to outputs $y_i$ (called reconstruction) through an internal representation code ($c_i$), i.e., a hidden layer that describes the code used to represent the input data. Thus, the network has two parts, i.e., the encoder function $c_i = f_\theta(x_i)$ and a decoder that outputs a reconstruction $y_i = g_\theta(c_i)$. The aim of this auto-encoder is to learn a representation encoding for a set of input data and, in particular, to identify and classify similar states and their properties.

The auto-encoder is trained to learn the representation encoding, which can be achieved by minimizing reconstruction errors. Upon receiving newly collected data (e.g., in batches), the trained auto-encoder may be used to reconstruct the input data $x_i$ to obtain $y_i = g_\theta(f_\theta(x_i))$. As it may be realized, the error (e.g., the squared error) in reconstructing $x_i$ may advantageously be used as a measure of how anomalous the input data is. Reasons for doing so are not straightforward; this is explained in detail in sect. 2.1.

Each input data may consist of a data point, comprising a number of features. Yet, an under-complete auto-encoder it typically used, for the purpose of dimensionality reduction. I.e., an under-complete auto-encoder is an auto-encoder whose code dimension is lower than the input dimension (the number of nodes in the hidden layer is less than the input layer). Thus, an under-complete auto-encoder as used herein constrains the code to have smaller dimension than the input data point, which, in turn, forces the auto-encoder to capture the most prominent features of the input data.

In some implementations, the auto-encoder takes, for each data point, n=27 features (i.e., 27 characteristics of parsed data) in input, reduces the dimensionality internally, and then revert to 27 features. It subsequently computes the reconstruction error by comparing the 27 features as obtained in output to the 27 features it took as input, as discussed in more detail in sect. 2.

In embodiments, the unsupervised model is implemented as a multi-layer perceptron. As known per se, a multilayer perceptron (MLP) consists of at least three layers of nodes, where each node is a neuron that uses a nonlinear activation function except for input nodes. An MLP relies on learning techniques such as backpropagation for training and can distinguish data that is not linearly separable. An MLP can advantageously be used in the present context, yet in the form of an auto-encoder, for high-speed. This way, past vectors of behavioral statistics can efficiently be used to build the statistical classification model, for classifying S20 non-stationary data and then detecting S35-S39 anomalies therein. More generally though, any type of unsupervised, machine learning model can be contemplated, provided they result in meaningful state representations.

Assuming that the unsupervised model is implemented S20 as an under-complete auto-encoder, the core classification S20 may start by performing S25, for each input data point, a dimension reduction of the input data point, so as to constrain the hidden layer to have a smaller dimension than the input and force the encoder to capture most prominent features of the input data. A similar dimension reduction is performed while training S21 the auto-encoder, which allows the most salient features of the normal traffic behavior to be better modeled in practice. In variants, dimensionality reduction can be achieved using other methods, as known per se.

Referring now more specifically to the flowchart of FIG. 4, the pre-selection steps S26-S28 may notably comprise scoring S26 each input data point. This can be achieved based on a reconstruction error of the auto-encoder, as noted above. I.e., the reconstruction error of the auto-encoder can be used as an approximation of the anomaly scores, as also explained in detail in sect. 2.1, see in particular Eq. (4). This way, anomaly scores are obtained S26, which may subsequently need be normalized, step S27, e.g., in essentially the same way as input data points can be normalized (see sect. 2.1). Then, data points can easily be sorted S28, thanks to their normalized anomaly scores.

A final pre-selection S28 can be operated by thresholding S28 the normalized anomaly scores. A subset of data points is accordingly obtained, which can be fed S28a into the next stage, i.e., the supervised model. In practice, time-series as obtained in output of the first stage S20 enter the second stage S30.

While a second stage S30 can be used, for reasons mentioned earlier, it is nevertheless noted that the first stage alone already allows fairly good performance to be achieved. For instance, experiments conducted by the inventors on real traffic data have shown that ~77% of known denial-of-service (DoS) or distributed DoS (DDoS) attacks could be successfully and very rapidly identified, with an autonomous auto-encoder as described above.

In embodiments, the supervised model used for the second stage is configured as a nearest-neighbor classifier. The subsequent anomaly detection steps S31-S33 may again be based on a non-Markovian, stateful classification of the selection of anomaly points taken as input. Thanks to the nearest-neighbor classifier, this can be achieved by querying S31 nearest-neighbors of the input points and, this, for each data point fed S28a into the supervised model.

Practically, the query S31 may involve computing distances between each data point received and already labelled data points (e.g., as stored on repository 14 in FIG. 3). Next, nearest-neighbors are identified S32 based on the computed distances. Then, the classification S31-S33 may simply consist in rating S33 each data point received as input, based on labels associated with the identified nearest-neighbors. Still, this may be subjected to the condition that S32 sufficiently close neighbors were identified at step S31. Then, the rating step S33 aims at ranking the newly received data points, based on a comparative assessment with already labelled (or otherwise marked data points). The rating S33 may for instance give rise to a mere numerical grade (i.e., an appreciation), which may for example later be transformed into a label (e.g., "threat", "non-threat", etc., as later exemplified in sect. 2.1), if necessary confirmed by a validation expert, as explained later. Yet, the rating step S33 may directly result in labelling a data point. Also, the labels used may themselves be numerical evaluations, e.g., based on a binary pair ("0" for "non-threat", "1" for "threat") or a more precise, e.g., real number-based scheme, if necessary. The ratings and labels can be regarded as more or less homogeneous appreciations, and may possibly use a same basis.

Next, the anomaly detection process S35-S39 may, for each data point examined, possibly trigger S35 an anomaly alert, depending S34 on the rating (or label) obtained S33 for said data point. Now, if S32 no sufficiently close neighbors could be identified at step S31 (based on the computed distances), a data point may instead be recirculated S37a. Data points for which no sufficiently close neighbors can be identified may explicitly be labelled S37 (e.g., be associated to a "don't know" label), prior to be recirculated S37a. Recirculated data points may be re-routed directly to the expert system (as assumed in FIG. 4) or, in variant, be re-injected in the supervised model, awaiting there until S32 sufficiently close nearest-neighbors can be identified.

Thus, at least three different outcomes may be involved in the second stage of FIG. 4, contrary to the two possible outcomes assumed in the embodiment of FIG. 3. This point is further discussed in sect. 2.1. In variants, however, one may simply adapt the threshold used at S32 to decide whether the nearest neighbors found are sufficiently close (step S37 is clearly optional).

In embodiments, the supervised model is further coupled to a validation expert system, which may include human operator(s) or be completely automatized. In that case, and as illustrated in FIGS. 3 and 4, the validation expert system may be fed with only a sample S36 of the outputs obtained from the supervised model S30. Such outputs comprise classified anomaly scores and corresponding data points. Thus, the validation expert system validates S39 anomaly statuses associated to only a sample of the data points obtained in output from the supervised classifier. This sample is obtained by sampling S36 points obtained in output of the second stage; it may for instance be constrained to correspond to less than 10% of the outputs of the second stage, to maintain a good performance. Yet, a fraction of 1 to 5%, or even less than 1%, may suffice, according to experiments performed by the inventors on real data.

Interestingly, the supervised model may additionally be fed S39a with at least part of the data points whose anomaly scores (e.g., labels) have already been validated by the validation expert system (see FIG. 4), in addition to data points corresponding to the pre-selection S28 obtained in output of the first stage. That is, validated data point may be stored in the repository 14, as reflected in FIG. 3. This way, valid data points continually come to enrich the basis against which newly received S28a data points can be queried S31, so as for the second stage to continually adapt to traffic evolutions. Only a fraction of the validated data point may be fed S39a into the second stage, e.g., less than 10% of said points. In variants, a more important fraction might be used. In addition, the repository may only maintain a time-limited history of such points, in order not to weaken performance.

Moreover, the validation expert system may further take S29 as input a fraction of the data points coming from the pre-selection S28, i.e., as a feedforward injection. This fraction is obtained by sampling S29 points from the pre-selection S28. This fraction may again be constrained to correspond to, e.g., less than 10% of said selection, so as not to saturate the expert system. Yet, sampling S29 between 1 and 5% (or even less than 1%) of the anomaly scores outputted from the first stage S20 happens to be sufficient in practice, according to experiments performed by the inventors, as discussed in detail in section 2.1.

Figure 6:
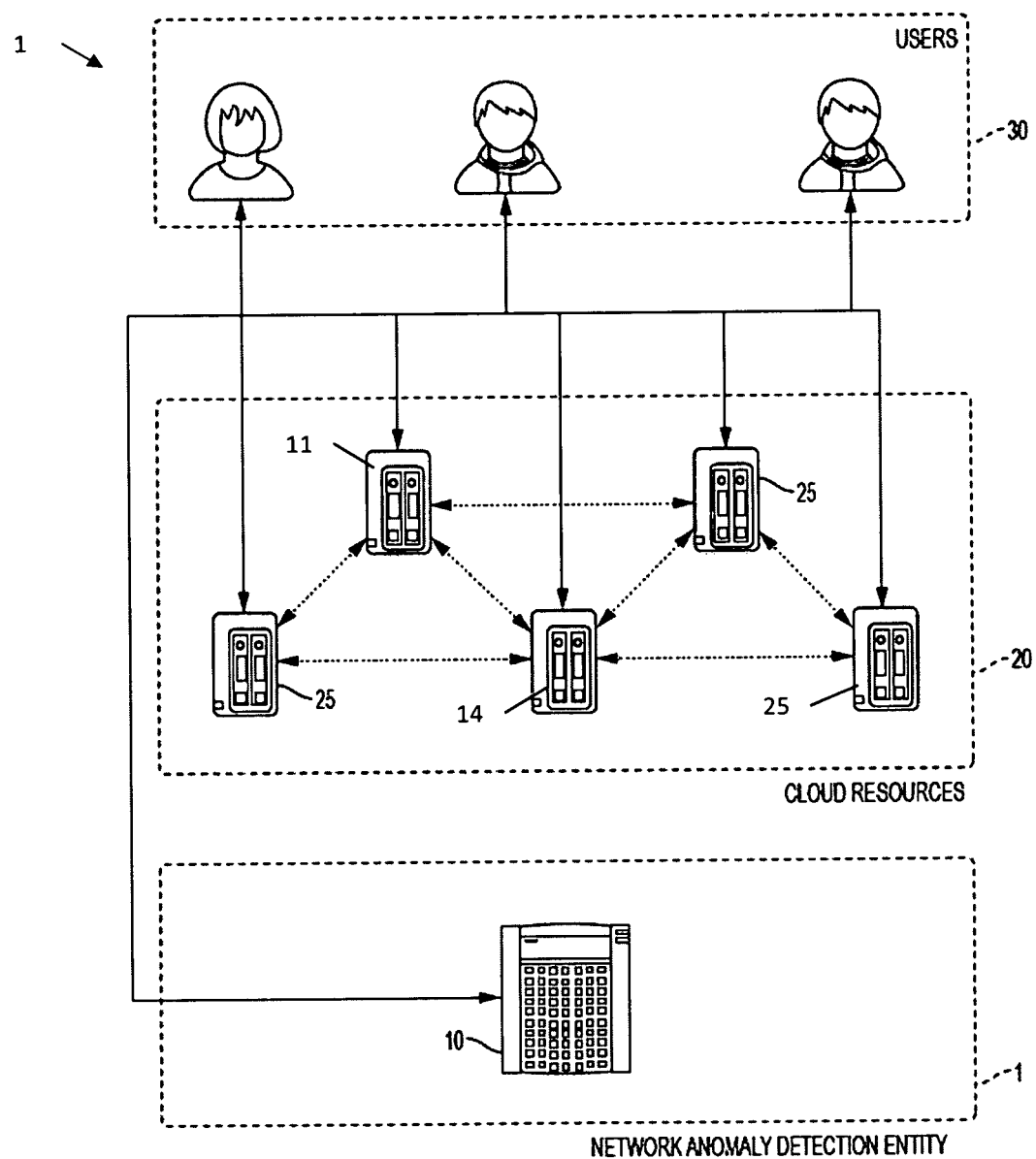
FIG. 6 schematically represents components (i.e., cloud resources and a network monitoring entity) and users of a computerized system, suited for implementing method steps as involved in embodiments. I.e., the network entity is adapted to interact with cloud components for detecting anomalies in non-stationary data in the cloud.

Referring to FIG. 6, another aspect of the invention is now described, which concerns a computerized system 1. The system 1 may for instance comprises an entity 10 (hardware and/or software), which may form part of the network 20 (e.g., a cloud, as assumed in the following) or otherwise be adapted to interact with components of the cloud 20 for detecting S35-S39 anomalies in non-stationary data in the cloud. The entity 10 is itself a computerized system, or forms part of a computerized system. In FIG. 6, this entity 10 is assumed to be distinct from the cloud nodes, for the sake of depiction. Yet, the tasks performed by this entity may, in variants, be delocalized over nodes of the network 20, and may possibly involve network entities, such as traffic monitoring entities (packet analyzers, etc.).

Network nodes 25 store and deploy resources, so as to provide cloud services, e.g., for users 30, which may include companies or other large infrastructures. An intermediate (e.g., software) layer is typically involved between users 30 and clients 25, e.g., to assign metadata needed to distribute cryptographic objects, upon request of the users or due to activities thereof.

Functional aspects of the system 1 have already been discussed earlier, with reference to the present methods. Therefore, such a system is only briefly described in the following. Essentially, and consistently with the present methods, this system comprises hardware and software means configured for: collecting S10 non-stationary data in the cloud 20 and, while (continually) collecting non-stationary data, classifying S20 the collected data according to a non-Markovian, stateful classification, based on an inference model. The system allows anomalies to be detected S35-S39 based on the classified data.

In embodiments, the system comprises a memory storing both the inference model (a trained, unsupervised machine learning model), and a nearest-neighbor classifier model. As explained earlier, the system may further be configured to select outputs from the inference model and feed the selected outputs into the supervised model, so as to detect anomalies.

In addition, the system can include a validation expert system, coupling to the supervised model, in operation. The validation expert system may for instance take as input a sample of the outputs from the supervised model, which may itself take as input a fraction of data points as obtained from the validation expert system, as discussed above.

Next, according to a final aspect, the invention can be embodied as a computer program product for detecting anomalies in non-stationary data in a network. This computer program product comprises a computer readable storage medium having program instructions embodied therewith, wherein the program instructions are executable by one or more processors, to cause to take steps according to the present methods. Aspects of this computer program products are discussed in detail in sect. 2.3. This program may for instance be run at the nodes (in a delocalized way) or at a dedicated entity 10, or at specific nodes of the network 20. Many other architectures can be contemplated, as the person skilled in the art will appreciate.

The above embodiments have been succinctly described in reference to the accompanying drawings and may accommodate a number of variants. Several combinations of the above features may be contemplated. In addition, many other variants than explicitly touched above can be contemplated. For example, in further embodiments, a set of traffic monitoring sensors may be relied on, which interact with cloud resources (nodes, network switches, network monitoring entities, etc.), as necessary to monitor the non-stationary data. Also, the non-Markovian, stateful classification models used may for instance require to average behavioral (protocol-agnostic) statistics of all/part of the non-stationary data, e.g., in constant, consecutive and non-overlapping time intervals, and maintain vectors of past, average behavioral statistics of such data. Then, using the past vectors, one can build a statistical classification model (inference model), e.g., a multi-layer perceptron in the form of an auto-encoder, in order to detect anomalies in the non-stationary data. Applying this inference model to behavioral statistics of new data flows allows anomalous traffic to be scored. The underlying learning algorithm may be continuously modified based on new observations of behavioral statistics (to continually obtain retrained models), in parallel with inferences. Retrained models can thus be timely substituted, so as to be able to quickly adapt to ever changing network conditions.

In addition, a database of recent anomalous data-points may be maintained, and anomalous data-points may be sampled (e.g., up to 0.5% or 1%) and sent to an expert entity (possibly including a human expert) for classification as threat/non-threat and further labeling, or for confirming anomaly statuses as detected by the supervised model. This database can thus be updated based on "expert" labels. The database can further be used to build a classification model and, based on nearest-neighbor queries, it can be decided when to generate anomaly alerts. While the nearest-neighbor-based classification allows part or all of the most sensitive anomalous data points to be finally classified, only a sample of anomalous data-points need be fed into the validation expert system. Feeding samples of the alerts, e.g., 0.5-1%, back to the expert user for classification, with a variable split feed between back- and forward-injections, further makes it possible to improve performance.

A detailed example of a two-stage, non-Markovian classification procedure is described in the next section.

2. Specific Embodiments—Technical Implementation Details

2.1 Detailed Example of a Two-Stage, Non-Markovian Classification

Figure 1:
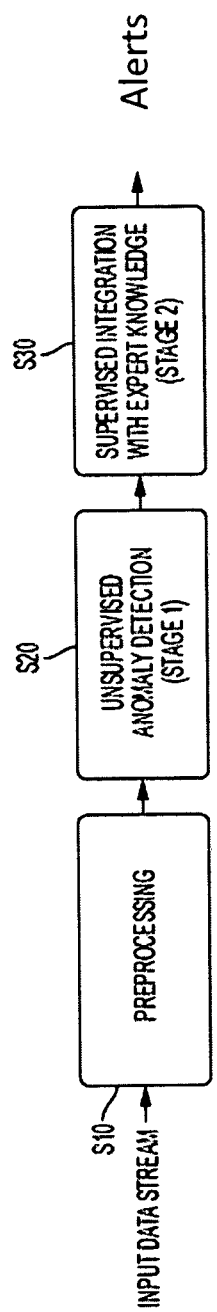
FIG. 1 is a high-level flowchart illustrating main stages of an anomaly detection pipeline, which include a data pre-processing stage, servicing a unsupervised process, itself coupled to a supervised process, as in embodiments of the invention.

Embodiments as described in this section are directed to detection models that can learn the long-term characteristics of a network and also adapt to new malicious behavior. Aspects of such embodiments concern:

The design and test of a network anomaly detection system that can operate on streams of both encrypted and non-encrypted network packets. Instead of simply reporting the detected anomalies, this system automatically classifies the majority of them as harmful or non-harmful, with only minimal human intervention;

The combination of a behavioral-based, unsupervised anomaly detection (first stage) with a supervised second stage, which reduces the human operator's workload; and The design of a real-time scalable, two-stage pipeline (FIGS. 1-3). The first stage uses an auto-encoder neural network model, while the second stage uses a nearest-neighbor classifier model, as described in sect. 1.

An objective is to detect the traffic volumetric outliers that are strong indicators of attacks (flood attempts, scanning attacks, etc.) or miss-configured equipment. The combination of both unsupervised and supervised stages makes it possible to: (a) detect novel, potentially harmful traffic that has not been previously encountered; and (b) reduce the need for manual examination of anomalous traffic by automatically filtering new anomalies based on previously identified false positives. The network data variability is addressed by implementing an anomaly detection pipeline that both: (i) adapts to changes in traffic behavior through online learning, and, (ii) retains memory of past behaviors.

The rest of this section is structured as follows. Section 2.1.1 describes the data pre-processing stage, while sections 2.1.1 and 2.1.3 respectively address the two main stages of the detection pipeline. Experimental results using real-world data are discussed in Section 2.1.4.

2.1.1 Data Pre-Processing

Consider streams of raw packets as input, which originate directly from a network link. Due to the ubiquity of end-to-end encryption in today's communications, embodiments discussed herein do not use DPI but instead base the detection only on (a) information included in the Layer 2 to 4 headers of the packets and (b) metrics of the network flows themselves (e.g., packets per second rate).

During pre-processing S10, for each traffic source s, per-source flow aggregations are created as data points that include all packets that originate from s and have timestamps within consecutive, non-overlapping time intervals of length $\Delta t$, where $\Delta t$ is a user-defined or adaptive time interval, with a default value of 1 sec. For each flow aggregation, a data point is obtained as a vector of n features computed over this aggregation. The features may include any metric that can be extracted from the flow aggregation, categorized as: (a) protocol-specific, e.g., the number of packets with the TCP SYN flag raised, (b) communication-pairs-specific, e.g., ratio of destination-to-source ports, (c) packet-specific, e.g., total number of packets and total bytes in the flow aggregation. A different set of features can in principle be contemplated. For all features that represent counters of packets with a specific property, one may further introduce features that represent the ratio of such packets to the total number of packets in the aggregation. The features are normalized online using their respective, exponentially weighted means and standard deviations, and are mapped to the range (−1, 1) with a hyperbolic tangent function.

Let $x_i$ denote the i-th normalized data point and as $x_{i,j}$ its j-th feature. The times-series generated from pre-processing the input is:

$$X=(x_1,x_2,\ldots)(x_{1,1}\ldots x_{1,n})=((x_{2,1}\ldots x_{2,n})\ldots) \quad (1)$$

2.1.2 Stage 1: Unsupervised Anomaly Detection

The goal of the first stage S20 of the pipeline is to assign to each data point $x_i \in X$ an anomaly score $a(x_i)$: a scalar value that represents the degree to which the data point diverges from the normal behavior. The reconstruction error of an auto-encoder is used as an approximation of the anomaly scores.

An auto-encoder neural network has a number of merits over other methods. The main advantage of using neural networks is that no assumptions on the distribution of the input data are necessary, as the model is able to discover the most relevant features by itself. Thus, compared to clustering, auto-encoders do not depend on the notions of distance or density in the input data. Also, auto-encoders that use nonlinear encoding and decoding functions have the capacity to learn a nonlinear generalization of multilayer perceptron principal components analysis (PCA), and can thus model more complex behaviors. Kernel-based PCA could address the linearity limitations of PCA. However, as in any kernel-based methods, the selection of the kernel highly depends on the distribution of the input data, which in the present case is unknown and non-stationary.

As evoked earlier, an auto-encoder with parameters $\theta$ is a feed-forward neural network that implements an encoding function $f_\theta$ and a decoding function $g_\theta$. Given an input data point $x_i$, the auto-encoder maps it to a code $c_i$ and then outputs $y_i$:

$$c_i=f_\theta(x_i), y_i=g_\theta(c_i)=g_\theta(f_\theta(x_i)) \quad (2)$$

The output $y_i$ is the reconstruction of $x_i$ according to c and $\theta$. Such a network can be trained so as to minimize the difference between the input $x_i$ and the output $y_i$ in order to create accurate reconstructions. Therefore, the training phase tries to estimate the set of parameters $\hat{\theta}$ that minimize the mean squared error over some subset $X^b$ of the set of normalized data points:

$$\hat{\theta} = \arg\min_\theta \left( \frac{1}{|X^b|} \sum_{x_i \in X^b} \|g_\theta(f_\theta(x_i)) - x_i\|^2 \right) \quad (3)$$

In order for the auto-encoder to model the inherent characteristics of normal traffic behavior, the auto-encoder may be designed to be under-complete. The dimension of the code $c_i$ was restricted to be lower than n, forcing the model to perform dimensionality reduction on the input. In the opposite case (i.e., if the dimension of the code is equal to n), the auto-encoder would learn the identity function and may thus not provide relevant information. Learning an under-complete representation forces the auto-encoder to capture the most salient features of the training data, which, in the context of network traffic, is the form of the traffic most commonly encountered. Thus, the model will be able to accurately reconstruct data points that are close to the norm, and will have a high reconstruction error on anomalous data points. It can be taken advantage of this property to calculate the anomaly score as the reconstruction (squared) error:

$$\alpha(x_i) = \|g_{\bar{\theta}}(f_{\theta}(x_i)) - x_i\|^2 \qquad (4)$$

It is expected that attacks can appear in a very sudden manner. Therefore, the anomaly score for each data point can be computed in near real-time. To do so, the slower training is separated from the faster score inference in two different instances of the model that run in parallel. The first instance is used for training and uses error backpropagation and gradient-based learning. Every time θ is updated after the error propagation of a single batch, θ is communicated to the second instance of the model. There, θ is used for real-time inference on the input time series until the next update, as assumed in FIG. 4. The updates of the model parameters essentially adapt the view of the model on what is considered normal traffic. As the notion of "normal" should not be expected to change much over time, there is no need for model updates after each data point. Instead, by using an update interval of, e.g., a few seconds, the slow training can be removed from the critical path of the pipeline, without any hindrance to the model in detecting novel anomalies in real time.

The size of each training batch $X^b$ and the points it contains affect (a) the rate of parameter updates and (b) how fast the model adapts to more recent input. A simple yet efficient way to create the batches involves grouping the points in blocks of size a. For example, batches with size equal to b blocks (a·b data points) may be used. A batch may for instance be calculated with a heuristic as shown in Algorithm 1 below, where $x_t$ is the most recent data point and c is some non-negative integer.

---
Algorithm 1 Batch selection for some t, a, b, c
---
1: k ← 0
2: $X^b$ ← { }
3: for i ∈ [0,b) do
4:    $X^b$ ← $X^b$ ∪ $\{x_{(t-a(k+1))}, \ldots, x_{t-ak}\}$
5:    k ← k + 1 + (i ÷ c)    ▷ Integer division
6: return $X^b$
---

This heuristic essentially adds to the batch a sample of data points from a large range but with a distribution skewed towards $x_t$. The range can for instance be calculated as $$\left(x_{\frac{ab}{2}\left(\frac{b}{c}+1\right)}, \ldots, x_t\right).$$

The parameters a and b control the batch size and together with c they control how much past information is included in the batch. Thus, each update of θ adapts the model to the newest data points, but retains characteristics of past data points.

In the final steps of the first stage, the anomaly scores are normalized in a similar manner as the data point features and the anomalies are extracted. The anomaly extraction step classifies as anomalies the data points with normalized scores above a given threshold Ω, creating the time series A of anomalous points:

$$A = (\ldots, x_i, \ldots), \forall x_i \in X \text{ where } a'(x_i) > \Omega \qquad (5)$$

That is, $a'(x_i)$ is the normalized value of $a(x_i)$.

2.1.3 Second Stage: Supervised Anomaly Classification

Unsupervised anomaly detection can be configured to not operate autonomously because not all anomalies may constitute malicious behavior in practice. Rather, the results may be examined and validated by an expert before an action is taken. Thus, for the second stage of the pipeline, a model is used which is based on the decisions of the expert on a small sample of A. The model then accurately decides on behalf of the expert on the majority of the data points. This partial automation (i) reduces the number of alerts the expert receives, and, therefore, the number of false positives that need be validated, and, (ii) allows the system to ingest a higher rate of incoming data points, as the bottleneck of manual validation is greatly reduced.

As assumed in FIG. 3, the expert may for instance have the ability to perform binary classification for each data point in A based on the values of the features $x_i$ and possibly the corresponding anomaly score $a'(x_i)$. The expert may for example perform the following mapping:

$$f_E: A \rightarrow \{\text{threat, non-threat}\} \qquad (6)$$

However, in order to avoid misclassification, a third label can be added. This way, the data points for which there is a high degree of uncertainty can be classified neither as "threat", nor as "non-threat". The model hence can perform the following mapping (as reflected in FIG. 4):

$$f_M: A \rightarrow \{\text{threat, non-threat, don't know}\} \qquad (7)$$

On the one hand, $f_M$ should produce, as often as possible, the same classification as the expert would. On the other hand, when there is a high degree of uncertainty, the label "don't know" can be a better choice than misclassifying.

A nearest-neighbor classifier (NNC) is used for modeling the classification. As one expects a large degree of data locality in the labeled data points, e.g., points that are part of the same attack would be very similar, the selection of distance-based models like the NNC are well suited. Yet, a threshold-based nearest-neighbor classifier (tNNC) can be used, instead of, e.g., a k-nearest-neighbor classifier, because, as one may realize, the system should consider all neighboring anomalies it is aware of, instead of just the k nearest ones.

The classification may be implemented as follows. First, the expert is presented with A. However, due to the potentially high rate of the time series, the expert can only process anomalies by sampling A. The time series of anomalies that is created by sampling is denoted by s(A). Next, each anomalous data point a of s(A) is classified by the expert, and stored along with its label $f_E(a)$ in a FIFO queue Q with maximum size $|Q|_{max}$. Based on the current state of Q, the tNNC will first calculate for each anomaly $a \in A$:

$$N_T^Q(a) = \{q, q \in Q \text{ and } d(a,q) < T\} \qquad (8)$$

which is the set of anomalies in Q within the T-neighborhood of a, for some distance metric d (e.g., Euclidian) and threshold T. It will also measure the number of threat and non-threat neighbors in $N_T^Q(a)$, $t_T^Q(a)$ and $nt_T^Q(a)$, respectively.

The classification is then computed as follows:

$$f_M(a) = \begin{cases} \text{threat} & \text{iff } \frac{t_T^Q(a)}{|N_T^Q(a)|} > C \\ \text{non-threat} & \text{iff } \frac{nt_T^Q(a)}{|N_T^Q(a)|} > C \\ \text{don't know} & \text{else} \end{cases} \qquad (9)$$

where C is a threshold that controls the confidence that the tNNC needs before labeling with "don't know". The "don't know" label in reflected by step S37 in FIG. 4.

Overall, by introducing the second stage of the pipeline the expert only needs to process the sample of anomalies plus the anomalies that the tNNC cannot classify. Therefore, with appropriate values for the s(A) rate, $|Q|_{max}$ and C, the accuracy of the tNNC can be tuned so that the rate of anomalies that need be processed by the expert becomes much lower than the rate of all the identified anomalies that would need be processed otherwise.

2.1.4 Experimental Results

The anomaly detection pipeline was tested on real-world data. The data included packet captures from a 10 Gbps link transferring general Internet traffic. The capture covers 3.5 hours of traffic and corresponds to a time series X of 59,750,000 data points. The capture also includes a small-scale UDP flood attack, during which, 42 external sources attempt to flood a specific destination in the network, by sending high rates of minimally-sized UDP datagrams.

Besides the flood attack, within the same data, the detector identified a number of anomalies that had not been previously detected by the network operators. A number of them showed malicious behavior.

2.1.4.1 Evaluation of Stage 1

For the purpose of experiments, input vectors with n=27 features were used together with a 5-layer auto-encoder, having layer sizes of 27, 20, 10, 20, and 27. The neural network uses the hyperbolic tangent as the activation function and batch normalization. As the model is trained based on data streams rather than static data, there is no danger of overfitting, thus no regularization is required.

For training, the present Inventors used batches of 2.5 million data points (a=50000, b=50, c=10 in Algorithm 1 above). Each iteration of the parameter update takes 8.1 seconds when training takes place in the GPU and 20.5 seconds when performed on the CPU. Were notably investigated the mean train error and test error as the model parameters are updated with each batch. As test error for batch i, one may calculate the mean reconstruction error for all data points that are processed between the i-th and i+1-th parameter updates. As it turned out, after about 50 parameter updates, the model had learned an initial representation of the normal traffic and from that point onward it was able to adapt and keep the low level of test error.

The normalized anomaly scores $a'(x_i)$ for all data points in a single block were investigated too. As present Inventors observed, the vast majority of anomaly scores were assigned small values, while spikes in the values could be observed, which denote anomalies included in the block. By varying the threshold value $\Omega$, one can vary the amount of data points that are classified as anomalies and subsequently the number of traffic sources that are detected as anomalous.

To evaluate the correctness of the auto-encoder detection, the present Inventors compared the results of the first stage of the pipeline with a known, offline PCA-based outlier detection method. For this they considered as input a matrix of the total number of data points. Each feature was mean subtracted and normalized by dividing it by the standard deviation. Using PCA, they calculated the principal components $v_1$ and the associated variance $\Delta_j$ of each component. As anomaly score, they used the Hotelling's $T^2$ score of each data point $x_i$:

$$T^2(x_i) = \sum_{j=1}^{n} \left( \frac{|x_i \cdot v_j|}{\lambda_i} \right)^2 \quad (10)$$

These anomaly scores follow an F-distribution; the points that belong to some top percentile can be classified as anomalies.

For example, for $\Omega=5$, almost all the anomalies identified by the auto-encoder belong in the top 5% of the PCA results. Conversely, 92% of the scores with the highest 1% $T^2$ scores are identified by the auto-encoder with $\Omega=3$. Thus, the auto-encoder-based streaming methodology and the PCA-based offline method assign high scores predominantly to the same data points but sometimes rank them differently, i.e., place them in different top percentiles.

To quantify the extent to which the first stage produces false positives, the anomalous sources were further classified manually for the case of 1=7. From the number of anomalous sources that were identified over the span of the 3.5 hours of traffic, present Inventors observed that, on average, 33 to 111 anomalous sources were detected per minute, depending on the value of $\Omega$; Thus, real-time manual classification would be very challenging for human operators.

2.1.4.2 Evaluation of Stage 2

For experimental purposes, $|Q|_{max}$ was set to 2000 (the available data could anyway not allow larger queues to be saturated). As n has a rather low value (i.e., 27), a simple exhaustive nearest-neighbor query algorithm was adopted. The algorithm compares the distance of the queried point with all points in Q and returns points that have a distance within T=0.5. The expert analyzes a sample of the time series of the anomalies with sampling rates that ensure that s(A) has a rate equal to, e.g., 1%, 2% or 5% of the rate of A.

The present Inventors have evaluated the performance of the tNNC using three metrics: classification potency, true positive rate (TPR), and false positive rate (FPR). The classification potency is defined as the percentage of data points that the tNNC classifies as "threat" or "non-threat". TPR and FPR are calculated for the same data points. Results have been compounded for multiple values of the confidence threshold C and the value $\Omega=7$. As expected, with higher C values, the classification potency drops, as there are more cases where the model does not find enough neighbors of the same label with which to classify a data point. For the same reason, TPR increases with higher values of C, as the model only classifies when it has high confidence. FPR generally decreases for the same reason, except for sample size 1%, where the data points in Q are not enough to accurately model the behavior of the expert. In general, these results show that all three metrics improve as the sample size increases.

The present Inventors have further investigated the percentage of anomalies that need classification with and without the second stage. For the latter case, these anomalies correspond to the sum of the sample s(A) and "don't know" labels. The results show that as the size of s(A) increases, the expert needs to classify a smaller percentage of anomalies, compared to what would be required if the second stage were not present. Also, with a 5% sample, the false alarms that the expert processes falls from 33.7% to just 8.9% of all anomalies. Therefore, larger sample sizes only benefit the overall system, as with less effort from the expert, the second stage provides better TPR and FPR.

All in all, these results showcase the benefits of adding the second stage of the pipeline. With an indicative sample size of 5% and a C value of 0.9, the amount of data points that the expert needs to validate drops to just 20.2% of the original size, while the behavior of the expert can still be accurately modeled, with 98.5% TPR and only 1.3% FPR.

2.1.4.3 Timing Measurements

A major concern in the design of any anomaly detection system is the execution performance, because the system should be able to ingest information from high-speed network links with large number of traffic sources. Thus, the maximum processing performance of each of the pipeline stages has been investigated, in terms of data points per second. To put things into perspective, the traffic examined corresponds on average to approximately 4 700 data points generated per second. Therefore, the pipeline has the capacity to ingest a link with up to four times the rate, or process in real time data points that correspond to a flow aggregation of 0.25 seconds.

As a final experiment, the present Inventors have tested the detection lag for the 42 sources of the UDP flood attack for multiple 1 values. The results have shown that most of the attackers could already be detected within 1 second, which is equal to Δt, i.e., the minimum detection latency possible in that case. For 1 values 3, 5, and 7, all detected attackers were found within just a few seconds from the beginning of the attack. The 10% of attackers that can only be identified when 1 equals 2, corresponds to attackers that have significantly lower rates and are comparable to normal traffic. Thus, on the one hand, they are more difficult to detect, but on the other hand, they do not have a noticeable effect on the network.

The embodiments discussed in the present section notably address the problem of high false alarm rates commonly encountered in unsupervised systems, by proposing an adaptive, online network anomaly detection system targeted to modern high-speed networks. This system can identify novel malicious traffic while it requires significantly less manual result examination, compared to known supervised approaches. This system combines an unsupervised stage that detects novel anomalous behavior, with a supervised stage that models the expert knowledge to filter out false alarms, based on an auto-encoder and a nearest-neighbor classifier, respectively. Experiments on real-world traffic show that the pipeline is able to detect the same anomalies as an offline anomaly detector despite its online mode of operation. Furthermore, it reduces the need for manual anomaly examination by almost 80%, while being able to automatically classify anomalous traffic as malicious with 98.5% true and 1.3% false positive rates.

2.2 Clouds

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

2.3 Systems, Methods and Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for detecting anomalies in non-stationary data in a network of computing entities, the method comprising:
    collecting non-stationary data in the network, wherein the non-stationary data comprises network packets, wherein collecting the non-stationary data comprises:
        for each network traffic source, creating a data point comprising a vector of fixed number of features computed over an aggregation of network packets from each network traffic source having timestamps within consecutive, non-overlapping time intervals of a pre-defined length, the features of the data point corresponding to a source Internet Protocol (IP), a packet size, an average number of packets per flow, a number of packets having a given flag, and a ratio of destination-to-source ports, each of the features having an assigned location starting with the source IP within the vector; and
    while collecting the non-stationary data:
        classifying the collected, non-stationary data according to a non-Markovian, stateful classification, based on an inference model, wherein the inference model is a trained, unsupervised machine learning model, implemented as an auto-encoder by a neural network, and wherein classifying the collected, non-stationary data comprises:
            forming data points from the collected, non-stationary data; and
            for each data point of the formed data points:
                feeding the auto-encoder with said each data point for the auto-encoder to reconstruct said each data point according to one or more parameters learned by a cognitive algorithm of the auto-encoder;
                scoring a degree of anomaly of said each data point, according to a reconstruction error in reconstructing said each data point, to obtain anomaly scores;
                selecting outputs from the classification performed based on the degree of anomaly, wherein the outputs selected have a degree of anomaly above a threshold degree; and
                feeding the selected outputs into a supervised, machine learning model, for it to further classify the selected outputs, whereby said anomalies are detected based on outputs from the supervised model;
        detecting anomalies in the classified data; and
    while collecting the non-stationary data and classifying the collected non-stationary data:
        concurrently training a cognitive algorithm corresponding to said inference model, using the collected non-stationary data from the network, to obtain a trained model, while the inference model is concurrently classifying the collected non-stationary data, wherein the cognitive algorithm is being trained until the trained model is used to replace the inference model; and replacing the inference model, as currently used to classify the non-stationary data, with the trained model.

2. The computer-implemented method according to claim 1, wherein:

the unsupervised model is implemented as an under-complete auto-encoder by the neural network, and wherein classifying the collected data further comprises, performing a dimension reduction, based on said each data point.

3. The computer-implemented method according to claim 1, wherein classifying the collected data further comprises:

sorting the data points according to their corresponding anomaly scores.

4. The computer-implemented method according to claim 3, wherein classifying the collected data further comprises:

normalizing the anomaly scores to obtain normalized anomaly scores.

5. The computer-implemented method according to claim 4, wherein classifying the collected data further comprises:

thresholding the normalized anomaly scores to obtain a selection of anomaly scores and a corresponding selection of data points.

6. The computer-implemented method according to claim 5, wherein classifying the collected non-stationary data further comprises:

feeding the selection of data points into a supervised, machine learning model, for it to further classify the selection of data points, whereby said anomalies are detected based on outputs from the supervised model.

7. The computer-implemented method according to claim 6, wherein:

the supervised model is configured as a nearest-neighbor classifier, and wherein further classifying the selection of data points comprises:

querying, for each data point of said selection of data points fed into the supervised model, nearest-neighbors of each data point in the selection of data points, wherein the nearest-neighbor is based on a computed distance of said each data point.

8. The computer-implemented method according to claim 7, wherein detecting anomalies further comprises:

triggering an anomaly alert based on a rating associated with said each data point.

9. The computer-implemented method according to claim 7, wherein:

the supervised model is coupled to a validation expert system, and wherein the method further comprises:

feeding the validation expert system with a sample of outputs from the supervised model, said outputs comprising data points as further classified by the supervised model, for the validation expert system to validate anomaly ratings associated to data points corresponding to said sample.

10. The computer-implemented method according to claim 1, wherein the method further comprising:

further classifying non-stationary data collected according to a non-Markovian, stateful classification, based on the substituted model, so as to be able to detect new anomalies in further classified data.

11. The computer-implemented method according to claim 1, wherein replacing the inference model, as currently used to classify the non-stationary data, with the trained model occurs based on a periodic interval.

12. The computer-implemented method according to claim 1, wherein replacing the inference model, as currently used to classify the non-stationary data, with the trained model occurs based on a data traffic of the non-stationary data in the network; and wherein each of the features of the data point are normalized to within a range of −1 to 1 with a hyperbolic tangent function.

13. A computerized system comprising hardware adapted to interact with a network of computing entities for detecting anomalies in non-stationary data, wherein the system is configured for:

collecting non-stationary data in the network, wherein the non-stationary data comprises network packets, wherein collecting the non-stationary data comprises:

for each network traffic source, creating a data point comprising a vector of fixed number of features computed over an aggregation of network packets from each network traffic source having timestamps within consecutive, non-overlapping time intervals of a pre-defined length, the features of the data point corresponding to a source Internet Protocol (IP), a packet size, an average number of packets per flow, a number of packets having a given flag, and a ratio of destination-to-source ports, each of the features having an assigned location starting with the source IP within the vector; and while collecting said non-stationary data:

classifying the collected non-stationary data according to a non-Markovian, stateful classification, based on an inference model, wherein the inference model is a trained, unsupervised machine learning model, implemented as an auto-encoder by a neural network, and wherein classifying the collected, non-stationary data comprises:

forming data points from the collected, non-stationary data; and for each data point of the formed data points:

feeding the auto-encoder with said each data point for the auto-encoder to reconstruct said each data point according to one or more parameters learned by a cognitive algorithm of the auto-encoder;

scoring a degree of anomaly of said each data point, according to a reconstruction error in reconstructing said each data point, to obtain anomaly scores;

selecting outputs from the classification performed based on the degree of anomaly, wherein the outputs selected have a degree of anomaly above a threshold degree; and feeding the selected outputs into a supervised, machine learning model, for it to further classify the selected outputs, whereby said anomalies are detected based on outputs from the supervised model;

detecting anomalies in the classified data; and while collecting the non-stationary data and classifying the collected non-stationary data:

concurrently training a cognitive algorithm corresponding to said inference model, using the collected non-stationary data from the network, to obtain a trained model, while the inference model is concurrently classifying the collected non-stationary data, wherein the cognitive algorithm is being trained until the trained model is used to replace the inference model; and replacing the inference model, as currently used to classify the non-stationary data, with the trained model.

14. The computerized system according to claim 13, wherein:

the system comprises a memory storing both an inference model, which is a trained, unsupervised machine learning model, and a nearest-neighbor classifier model, which is a supervised machine learning model, and wherein the system is further configured to:

select outputs from data as classified with said inference model and feed the selected outputs into the supervised, machine learning model, so as to detect said anomalies based on outputs from the supervised model.

15. The computerized system according to claim 14, wherein:

the system further comprises a validation expert system configured to couple to the supervised model, so as for the validation expert system to take as input a sample of outputs from the supervised model and the supervised model to take as input a fraction of outputs obtained from the validation expert system.

16. A computer program product for detecting anomalies in non-stationary data in a network of computing entities, the computer program product comprising a computer readable storage medium having program instructions embodied therewith, the program instructions executable by one or more processors, to cause to:

collect non-stationary data in the network, wherein the non-stationary data comprises network packets, wherein collecting the non-stationary data comprises:

for each network traffic source, creating a data point comprising a vector of fixed number of features computed over an aggregation of network packets from each network traffic source having timestamps within consecutive, non-overlapping time intervals of a pre-defined length, the features of the data point corresponding to a source Internet Protocol (IP), a packet size, an average number of packets per flow, a number of packets having a given flag, and a ratio of destination-to-source ports, each of the features having an assigned location starting with the source IP within the vector; and while collecting said non-stationary data:

classify the collected non-stationary data according to a non-Markovian, stateful classification based on an inference model, wherein the inference model is a trained, unsupervised machine learning model, implemented as an auto-encoder by a neural network, and wherein classifying the collected, nostationary data comprises:

forming data points from the collected, non-stationary data; and for each data point of the formed data points:

feeding the auto-encoder with said each data point for the auto-encoder to reconstruct said each data point according to one or more parameters learned by a cognitive algorithm of the auto-encoder;

scoring a degree of anomaly of said each data point, according to a reconstruction error in reconstructing said each data point, to obtain anomaly scores;

selecting outputs from the classification performed based on the degree of anomaly, wherein the outputs selected have a degree of anomaly above a threshold degree; and feeding the selected outputs into a supervised, machine learning model, for it to further classify the selected outputs, whereby said anomalies are detected based on outputs from the supervised model;

detect anomalies in the non-stationary data collected, according to the classified data; and while collecting the non-stationary data and classifying the collected non-stationary data:

concurrently training a cognitive algorithm corresponding to said inference model, using the collected non-stationary data from the network, to obtain a trained model, while the inference model is concurrently classifying the collected non-stationary data, wherein the cognitive algorithm is being trained until the trained model is used to replace the inference model; and replacing the inference model, as currently used to classify the non-stationary data, with the trained model.

* * * * *